(12) United States Patent
O'Hern (10) Patent No.: US 8,156,518 B2
(45) Date of Patent: Apr. 10, 2012

(54) SYSTEM AND METHOD FOR FILTERING AUDIO CONTENT

(75) Inventor: William A. O'Hern, Spring Lake, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 507 days.

(21) Appl. No.: 11/699,741

(22) Filed: Jan. 30, 2007

(65) Prior Publication Data

US 2008/0184284 A1 Jul. 31, 2008

(51) Int. Cl.
*H04N 7/16* (2011.01)

(52) U.S. Cl. ......................................... 725/28
(58) Field of Classification Search ................. 725/28
See application file for complete search history.

(56) References Cited

U.S. PATENT DOCUMENTS

| | | | |
|---|---|---|---|
| 6,075,550 A * | 6/2000 | Lapierre | 725/25 |
| 6,166,780 A | 12/2000 | Bray | |
| 6,972,802 B2 | 12/2005 | Bray | |
| 7,360,234 B2 * | 4/2008 | Robson et al. | 725/127 |
| 7,461,004 B2 * | 12/2008 | Cormack et al. | 704/500 |
| 2004/0006767 A1 * | 1/2004 | Robson et al. | 725/28 |
| 2004/0049780 A1 | 3/2004 | Gee | |
| 2005/0086705 A1 | 4/2005 | Jarman et al. | |
| 2005/0268317 A1 | 12/2005 | Cormack et al. | |
| 2006/0005218 A1 | 1/2006 | Kroeger et al. | |
| 2006/0031870 A1 | 2/2006 | Jarman et al. | |
| 2006/0095262 A1 | 5/2006 | Danieli | |
| 2006/0130119 A1 | 6/2006 | Candelore et al. | |
| 2006/0277564 A1 | 12/2006 | Jarman | |
| 2007/0250852 A1 * | 10/2007 | Adams et al. | 725/28 |
| 2009/0089828 A1 * | 4/2009 | Carlsgaard et al. | 725/28 |

FOREIGN PATENT DOCUMENTS

| WO | 02080530 A2 | 10/2002 |
|---|---|---|
| WO | 2006112822 A1 | 10/2006 |

OTHER PUBLICATIONS

PCT Search Report (PCT/US2008/000632) mailed Jan. 22, 2009.
Written Opinion of the International Searching Authority for PCT/US2008/000632, mailed on Jan. 22, 2009.

* cited by examiner

*Primary Examiner* — Pankaj Kumar
*Assistant Examiner* — Charles N Hicks
(74) *Attorney, Agent, or Firm* — Toler Law Group, PC (57) ABSTRACT

A system and method for filtering audio content are provided. An audio data filtering system may include an input interface to receive audio data. The system may also include an analysis module to compare a textual representation of the audio data to data identifying prohibited audio content. The system may also include a packet filter to prevent transmission of portions of the audio data matching prohibited audio content to a remote user device. The system may further include an output interface to transmit portions of the audio data not identified as prohibited audio content to the remote user device.

21 Claims, 5 Drawing Sheets

SYSTEM AND METHOD FOR FILTERING AUDIO CONTENT

FIELD OF THE DISCLOSURE

The present disclosure is generally related to systems and methods for filtering audio content.

BACKGROUND

Some households may include devices that access multimedia content that do not include parental control features. Other devices, such as some television systems and set-top boxes include a parental control feature that blocks selected channels or content. For example, televisions and set-top boxes equipped with a "V-Chip" allow television programs with particular ratings to be blocked. Such parental control features typically function to entirely block certain content. Nonetheless, entirely blocking content may restrict access to some content that is not offensive in its entirety. Hence, there is a need for an improved system and method for filtering audio content.

DETAILED DESCRIPTION OF THE DRAWINGS

In a particular embodiment, a system to filter audio data is disclosed that includes an input interface to receive audio data. The system may also include an analysis module to compare a textual representation of the audio data to data identifying prohibited audio content. The system may also include a packet filter to prevent transmission of portions of the audio data matching prohibited audio content to a remote user device. The system may further include an output interface to transmit portions of the audio data not identified as prohibited audio content to the remote user device.

In another particular embodiment, a method of filtering audio data is disclosed that includes comparing a textual representation of audio data received at a filter server with data identifying prohibited audio content. The method may also include transmitting portions of the audio data not identified as prohibited audio content to a remote user device. The method may not transmit other portions of the audio data identified as prohibited audio content to the remote user device.

In a particular embodiment, a computer readable medium is disclosed that includes computer readable instructions executable by a processor to compare a textual representation of audio data to data identifying prohibited audio content. The instructions may also be executable by the processor to send content not identified as prohibited audio content to a remote user device and to not send data packets associated with the prohibited audio content to the remote user device.

Figure 1:
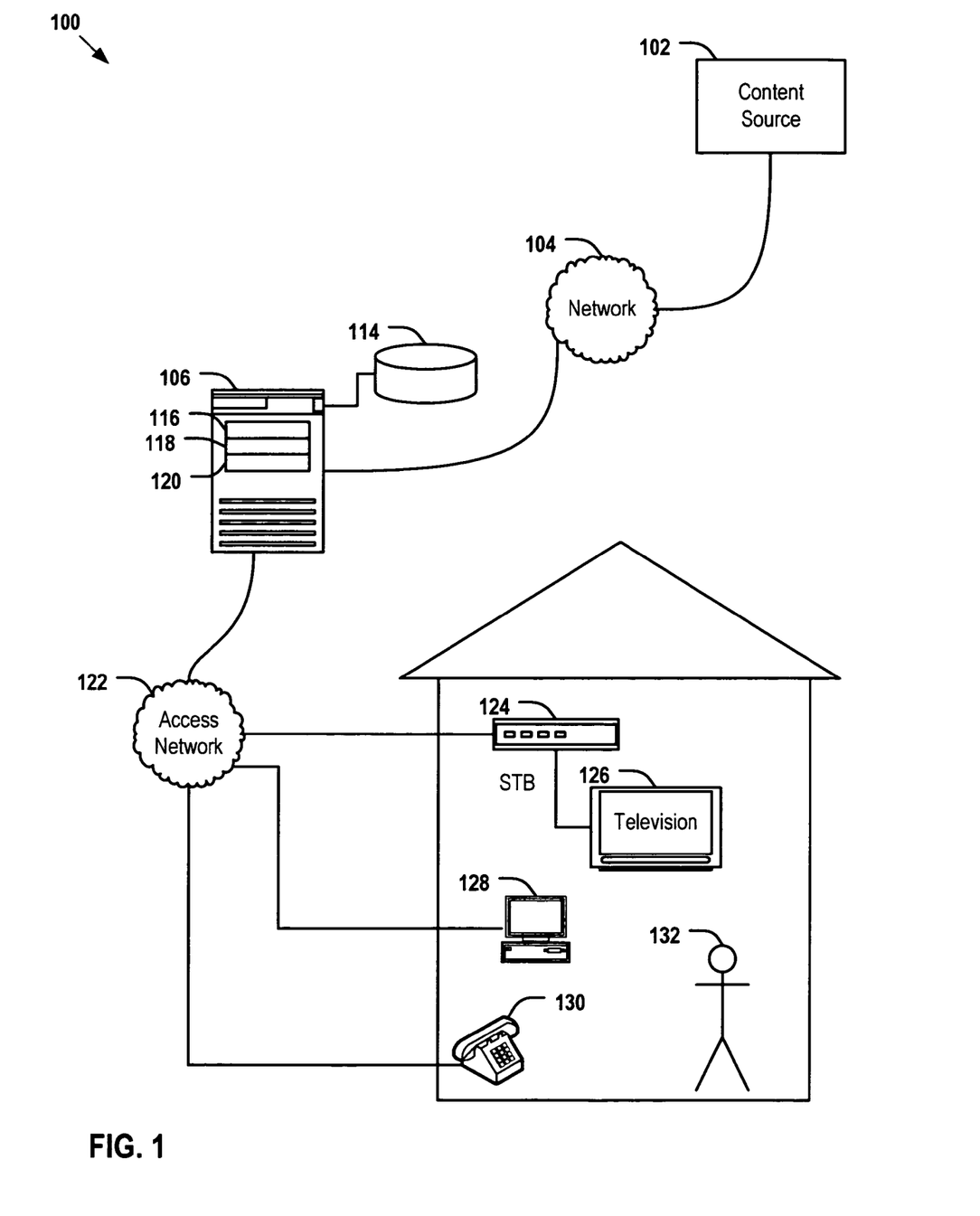
FIG. 1 is a block diagram of a first illustrative embodiment of a system to filter audio content.

FIG. 1 depicts a block diagram of a first illustrative embodiment of a system 100 to filter audio content. The system 100 includes a content source 102. The content source 102 provides content to one or more remote user devices, such as a set-top box device 124, a television device 126, a computing device 128, or a telephone 130, via a filter server 106. The content may include, for example, television content, video on demand content, internet-hosted content, other content including an audio component, or any combination thereof.

In a particular embodiment, the filter server 106 may monitor the content sent to one or more of the remote user devices 124-130. In an illustrative embodiment, the filter server 106 may receive content from the content source 102 via a network 104 and prevent transmission of prohibited content to one or more of the remote user devices 124-130. In an illustrative embodiment, the filter server 106 can include a blocking module 116. The blocking module 116 may block content meeting certain criteria. For example, the blocking module 116 may block all content from certain content sources, may block content having certain ratings, may block content with other specified characteristics, or any combination thereof. In a particular illustrative embodiment, parental control settings stored in a parental control database 114 may identify the content or content sources to be blocked by the blocking module 116.

In an illustrative embodiment, the filter server 106 may include an analysis module 118 and a packet filter 120. The analysis module 118 may compare a textual representation of audio data received from the content source 102 to data identifying prohibited audio content. In a particular embodiment, the data identifying prohibited audio content may include a list of prohibited terms. In an illustrative embodiment, the textual representation of the audio content may be received from the content source 102. In another illustrative embodiment, the textual representation of the audio content may be accessed from another data source, such as a closed captioning database. In another illustrative embodiment, the textual representation of the audio content may be prepared by the filter server 106 using voice to text conversion. In a particular embodiment, the parental control database 114 may include the list of prohibited terms.

In an illustrative embodiment, the packet filter 120 may inhibit or prevent transmission of data packets associated with prohibited content. For example, the packet filter 120 may drop the data packets associated with prohibited content. In another example, the packet filter 120 may replace the data packets associated with prohibited content with other data packets that do not include prohibited content.

In a particular embodiment, the filter server 106 may send the content, other than the prohibited content, to one or more remote user devices 124, 126, 128, 130 via a network, such as the access network 122. In a particular embodiment, one or more of the remote user devices 124, 126, 128, 130 may be configured to access the access network 122 to receive content. For example, one or more of the remote user devices 124, 126, 128, 130 may communicate with a streaming media server to access the content.

Figure 2:
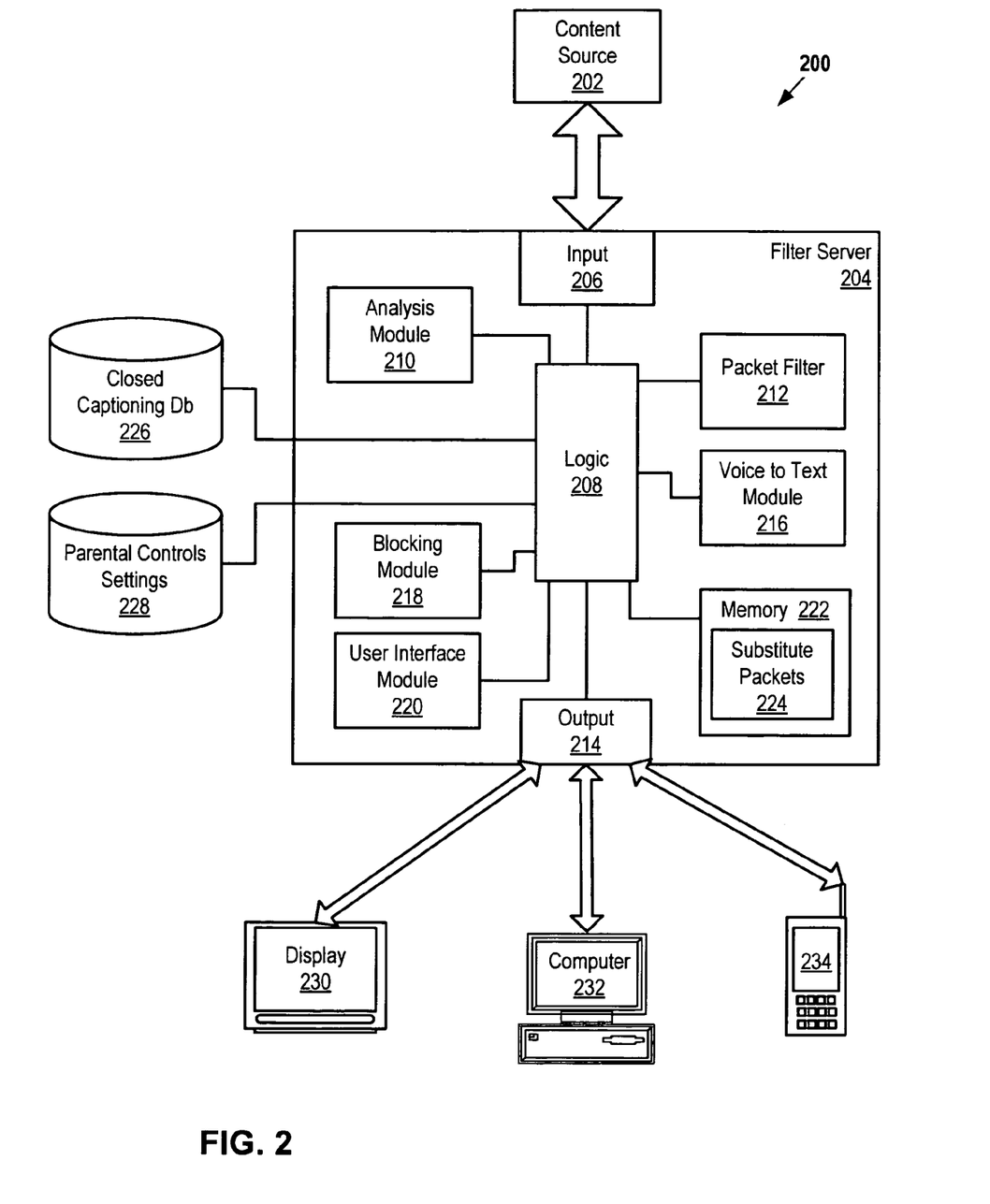
FIG. 2 is a block diagram of a second illustrative embodiment of a system to filter audio content.

FIG. 2 depicts a block diagram of a second illustrative embodiment of a system to filter audio content, which is generally designated 200. The system 200 includes a filter server 204 adapted to communicate with a content source 202, and with one or more remote user devices, such as a set-top box device, a display device 230, a computing device 232 and a mobile communication device 234.

In a particular embodiment, the filter server 204 may include an input interface 206, an analysis module 210, a packet filter 212, a voice to text module 216, a blocking module 218, a user interface module 220, a memory 222, an output interface 214, and logic 208. The modules 210, 212, 216, 218, 220 may be implemented as software stored in the memory 222 and may be executable by the logic 208. In a particular illustrative embodiment, one or more of the modules 210, 212, 216, 218, 220 may be implemented as hardware or as a combination of hardware and software accessible to the logic 208.

In a particular embodiment, the input interface 206 may receive data from the content source 202. The received data may include audio data. The content source 202 may include any source of content that includes an audio component, including, for example, a television broadcast source, a radio broadcast source, a telephone communication network, a streaming media content server, another audio content source, or any combination thereof. In a particular illustrative embodiment, the received data can include video data with corresponding audio data. In another particular illustrative embodiment, the received data can include video data with corresponding audio data and a textual representation of the audio data, such as closed captioning text. The data may be received via any communication protocol, such as a streaming media protocol, an internet protocol television (IPTV) multicast, another communication protocol, or any combination thereof. The input interface 206 may pass the received data to the logic 208 for analysis and processing.

In a particular embodiment, the logic 208 may identify the audio component of the received data via the analysis module 210. The analysis module 210 may also identify a textual representation of the audio data. For example, the received data may include closed captioning data, and the analysis module 210 may access the closed captioning data to identify the textual representation of the audio data. If the received data does not include closed captioning data, the analysis module 210 may access a closed captioning database 226 to identify a textual representation of the audio data. If the closed captioning database 226 does not include a textual representation of the audio data, the analysis module 210 may invoke the voice to text module 216 to generate a textual representation of the audio data based on voice to text technology.

The analysis module 210 may also access a data identifying prohibited audio content, such as a list of prohibited terms. In an illustrative embodiment, the list of prohibited terms may be stored in a parental control settings database 228 accessible to the logic 208. The list of prohibited terms may be determined based on user adjustable settings. In an illustrative embodiment, a user may access the parental control settings via user the interface module 220. The user interface module 220 may provide a user interface display at a display device, such as a set-top box device, the display device 230, the computing device 232 or the mobile communication device 234. The user interface display may allow the user to modify the parental control settings. The user interface module 220 may require authentication of a user's identification before allowing the user to access the parental control settings to prevent unauthorized parties (e.g., children) from tampering with the settings.

In an illustrative embodiment, the user may access the list of prohibited terms directly to modify the list by adding or removing terms. In another illustrative embodiment, the user may access the list of prohibited terms indirectly to include more or fewer terms in the list. For example, several predefined lists of prohibited terms may be available for the user select from to define a more restrictive or less restrictive list of prohibited terms. In a particular illustrative embodiment, the predefined lists of prohibited terms may be categorized to identify particular types of terms to prohibit, such as profanity, racial epithets, sexual terms, religious epithets, and so forth. In a particular illustrative embodiment, the predefined lists of prohibited terms may be categorized into various strictness levels, or various rating levels. For example, a mild expletive may be included in a list of prohibited terms associated with a more strict rating, but may not be included in a list associated with a less strict rating.

In a particular embodiment, identify prohibited audio content by comparing the textual representation of the audio data to the data identifying prohibited audio content. In a particular embodiment, if prohibited content is found, the logic 208 may prevent transmission of the prohibited audio content via the packet filter 212.

In a particular embodiment, the packet filter 212 may identify data packets associated with the prohibited audio content. In an illustrative embodiment, the packet filter 212 may drop data packets identified as containing prohibited audio content. For example, the data packets may be omitted from a data stream sent by the output interface 214 to a remote user device. In another illustrative embodiment, the packet filter 212 may replace one or more data packets identified as containing prohibited content with substitute data packets 224 that do not include prohibited audio content. In a particular illustrative embodiment, substitute data packets 224 may be stored in the memory 222. In a particular illustrative embodiment, the substitute data packets 224 may be placeholders, including no audio data. In another particular illustrative embodiment, the substitute data packets 224 may include audio content that is not prohibited. For example, the substitute data packets may include a tone that is substituted to censor prohibited audio content. In another example, the substitute data packets 224 may include data packets including terms that are selected as substitute terms for terms from the list of prohibited terms. For example, one or more entries in the list of prohibited terms may be associated with a substitute term. The substitute term may be associated with one or more substitute data packets. When the prohibited term is encountered, the data packet(s) including the prohibited term may be replaced with the data packet(s) associated with the substitute term.

After the packet filter 212 has modified the data to prevent transmission of prohibited audio content, the output interface 214 may send the content not identified as prohibited audio content to one or more of the remote user devices 230, 232, 234. In an illustrative embodiment, the content may be sent via a streaming media protocol. For example, the content may be streamed to the remote user device via multicast over an IPTV network.

In a particular embodiment, the filter server 204 may also include the blocking module 218 to inhibit transmission of substantially all content from the content source 202 to the one or more remote user devices 230, 232, 234. In an illustrative embodiment, the content source 202 may be entirely blocked based on the identity of the content source 202. For example, all content from particular web-sites or television channels may be blocked. In another illustrative embodiment, the content may be blocked based on a rating associated with the content. For example, the content may be associated with a television parental guidelines rating indicating that the content has a rating, for example of: TV-G, TV-Y, TV-Y7, TV-Y7-FV, TV-PG, TV-14, or TV-MA. In another example, the content may be associated with a motion picture rating system rating indicating that the content has a rating of G, PG, PG-13, NC-17, or is not rated (NR). In another example, the content may be associated with an explicit lyrics parental advisory indicating that the content includes explicit song lyrics. The parental control settings database 228 may include user adjustable settings for blocking content or content sources associated with selected ratings. The parental control settings database 228 may also include user adjustable settings for blocking particular content sources entirely.

Figure 3:
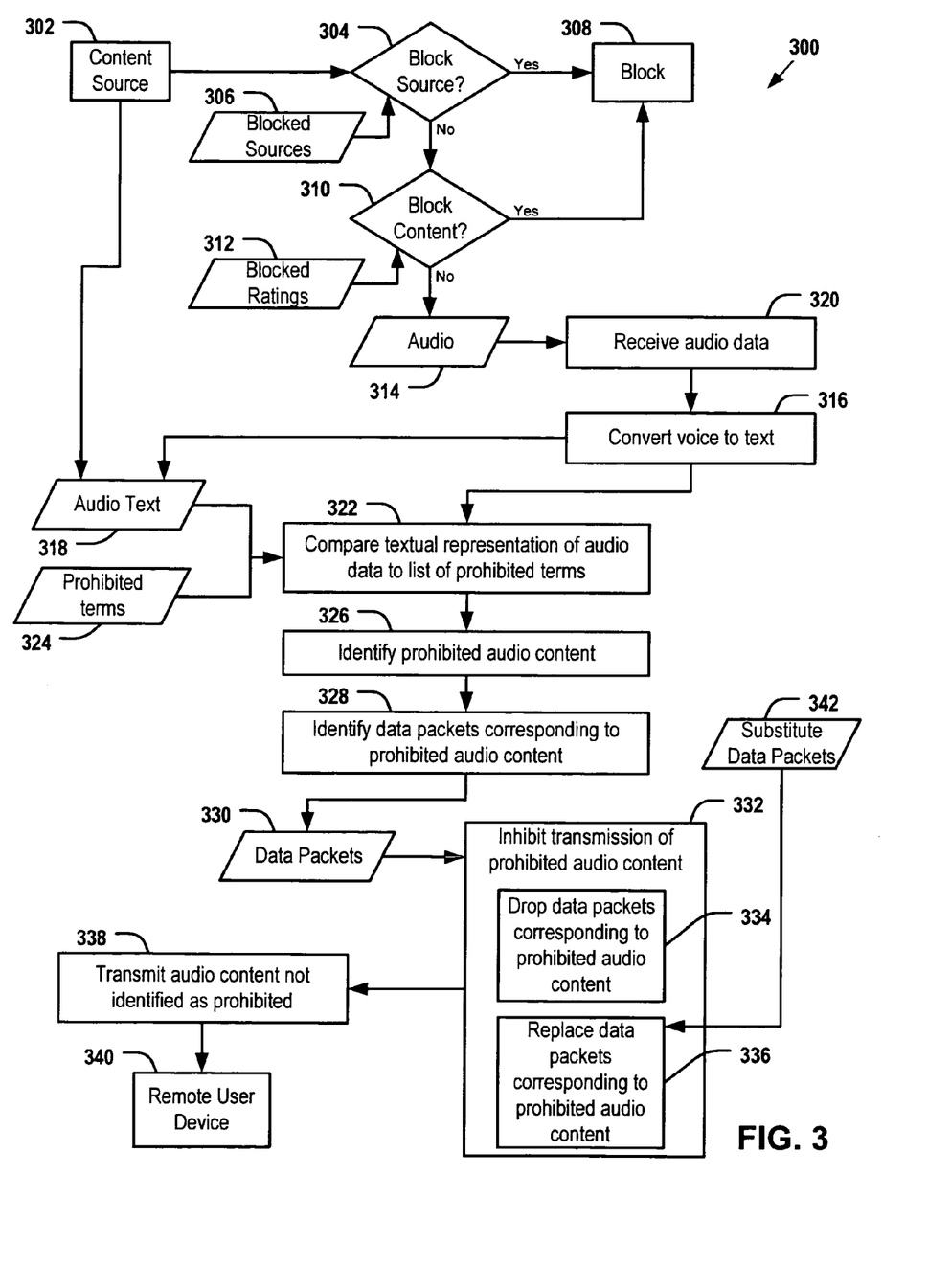
FIG. 3 is a flow chart of an illustrative embodiment of a method of filtering audio content.

FIG. 3 depicts a flow chart of an illustrative embodiment of a method of filtering audio content designated 300. In the method 300, a content source 302 sends content to a remote user device 340, such as a television, a set-top box, a computer, a telephone, a mobile communication device, or another device for receiving content including an audio component. The method 300 includes, at 304, determining whether to block the content source 302 based on a list of blocked sources 306. If the content source 302 is on the list of blocked sources 306, the method 300 blocks the content, at 308. If the content source 302 is not on the list of blocked sources 306, the method 300 may include, at 310, determining whether to block the content. In an illustrative embodiment, the method 300 can include accessing a list of blocked ratings 312, and comparing a rating of the content to the list of blocked ratings 312. If the content's rating is in the list of blocked ratings 312, the method may include blocking 308 the content. If the content's rating is not in the list of blocked ratings 312, the method may include, at 320, receiving at least an audio data 314 component of the content.

In a particular embodiment, the method 300 may include, at 316, converting the received audio data into text using automated voice to text conversion. In another particular embodiment, the method 300 may include, receiving a textual representation of the audio data 318 from the content source 302. For example, the textual representation of the audio data 318 may be received as closed captioning text sent with the data stream that includes that audio data 314.

In a particular embodiment, the method includes, at 322, comparing the textual representation of the audio data 318 to a list of prohibited terms 324 and, at 326, identifying prohibited audio content. In an illustrative embodiment, the list of prohibited terms 324 may be based at least partially on user adjustable settings. The list of prohibited terms may identify specific offensive language content, such as profane terms, and so forth.

In an illustrative embodiment, the method 300 includes, at 328, identifying one or more data packets 330 that include or correspond to the prohibited audio content. In a particular embodiment, the method 300 includes, at 332, inhibiting transmission of the prohibited audio content to the remote user device. In an illustrative embodiment, inhibiting transmission of the prohibited audio content may include, at 334, dropping the data packets 330 that include or correspond to the prohibited audio content. For example, the data packets 330 may be deleted from or omitted from a data stream that includes the content. In another illustrative embodiment, inhibiting transmission of the prohibited audio content may include, at 336, replacing the data packets 330 that include or correspond to the prohibited audio content with substitute data packets 342. In a particular illustrative embodiment, the substitute data packets 342 may be place holders that include no audio content. In another illustrative embodiment, the substitute data packets 342 may include non-voice audio content, such as a tone or "bleep". In still another illustrative embodiment, the substitute data packets 342 may include voice audio content, such as terms that are selected as substitutes for one or more terms from the list of prohibited terms 324. In yet another illustrative embodiment, the substitute data packets 342 may include place holders, non-voice audio content, voice audio content, other content or any combination thereof. In this embodiment, the method 300 may select a substitute data packet 342 based on user configurable settings.

In a particular embodiment, the method 300 includes, at 338, transmitting content not identified as prohibited audio content to the remote user device 340. For example, the content may be transmitted via an IPTV multicast or other streaming media protocol.

Figure 4:
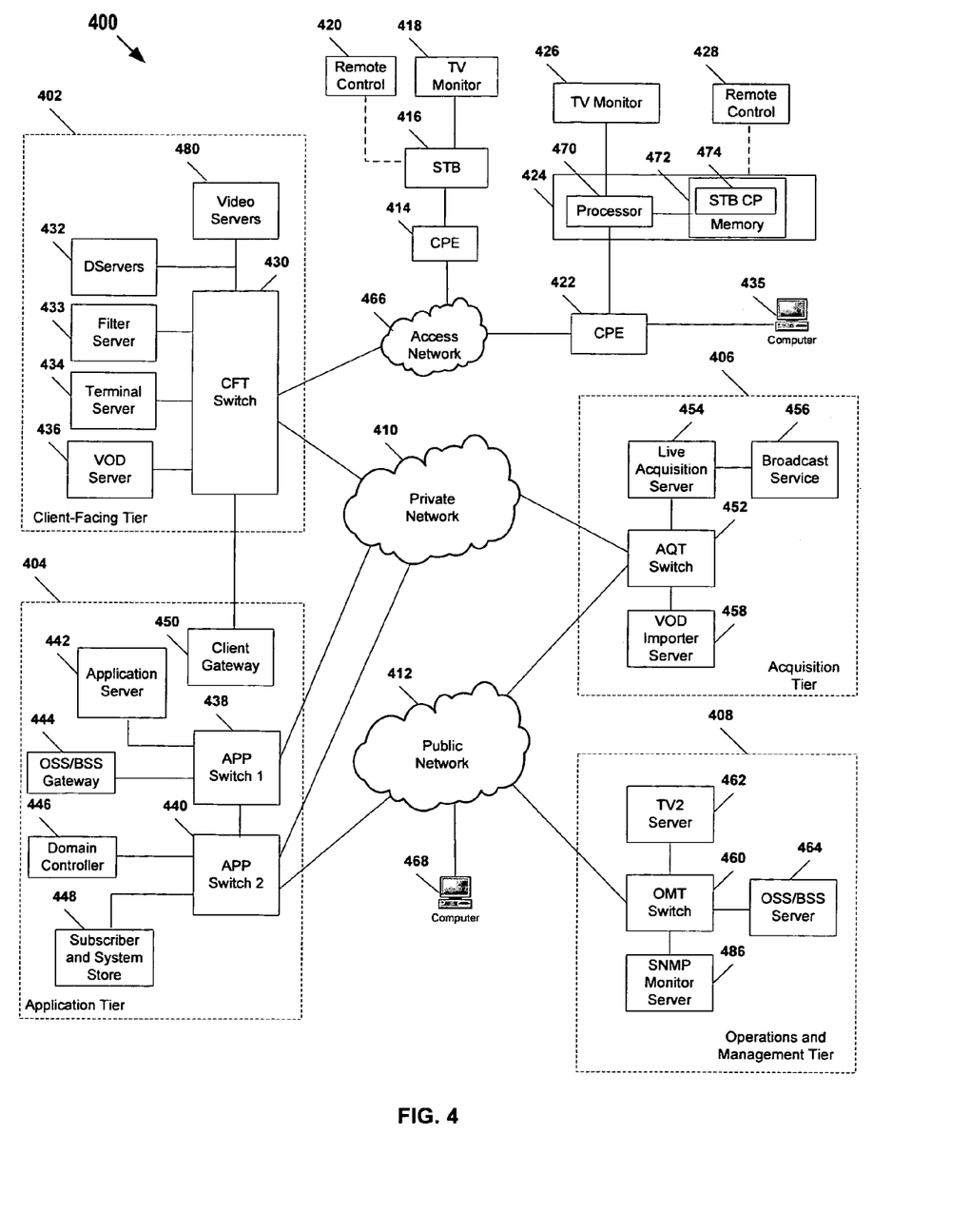
FIG. 4 is a block diagram of a third illustrative embodiment of a system to filter audio content.

Referring to FIG. 4, an illustrative embodiment of an Internet Protocol Television (IPTV) system that may be used to provide content to a user device and to filter audio content is illustrated and is generally designated 400. As shown, the system 400 can include a client facing tier 402, an application tier 404, an acquisition tier 406, and an operations and management tier 408. Each tier 402, 404, 406, 408 is coupled to a private network 410; to a public network 412, such as the Internet; or to both the private network 410 and the public network 412. For example, the client-facing tier 402 can be coupled to the private network 410. Further, the application tier 404 can be coupled to the private network 410 and to the public network 412. The acquisition tier 406 can also be coupled to the private network 410 and to the public network 412. Additionally, the operations and management tier 408 can be coupled to the public network 412.

As illustrated in FIG. 4, the various tiers 402, 404, 406, 408 communicate with each other via the private network 410 and the public network 412. For instance, the client-facing tier 402 can communicate with the application tier 404 and the acquisition tier 406 via the private network 410. The application tier 404 can communicate with the acquisition tier 406 via the private network 410. Further, the application tier 404 can communicate with the acquisition tier 406 and the operations and management tier 408 via the public network 412. Moreover, the acquisition tier 406 can communicate with the operations and management tier 408 via the public network 412. In a particular embodiment, elements of the application tier 404, including, but not limited to, a client gateway 450, can communicate directly with the client-facing tier 402.

The client-facing tier 402 can communicate with user equipment via an access network 466, such as an Internet Protocol Television (IPTV) access network. In an illustrative embodiment, customer premises equipment (CPE) 414, 422 can be coupled to a local switch, router, or other device of the access network 466. The client-facing tier 402 can communicate with a first representative set-top box device 416 via the first CPE 414 and with a second representative set-top box device 424 via the second CPE 422. In a particular embodiment, the first representative set-top box device 416 and the first CPE 414 can be located at a first customer premise, and the second representative set-top box device 424 and the second CPE 422 can be located at a second customer premise. In another particular embodiment, the first representative set-top box device 416 and the second representative set-top box device 424 can be located at a single customer premise, both coupled to one of the CPE 414, 422. The CPE 414, 422 can include routers, local area network devices, modems, such as digital subscriber line (DSL) modems, any other suitable devices for facilitating communication between a set-top box device and the access network 466, or any combination thereof. In a particular embodiment, one or more other user devices, such as computer 435.

In an exemplary embodiment, the client-facing tier 402 can be coupled to the CPE 414, 422 via fiber optic cables. In another exemplary embodiment, the CPE 414, 422 can be digital subscriber line (DSL) modems that are coupled to one or more network nodes via twisted pairs, and the client-facing tier 402 can be coupled to the network nodes via fiber-optic cables. Each set-top box device 416, 424 can process data received via the access network 466, via an IPTV software platform, such as Microsoft® TV EPTV Edition.

The first set-top box device 416 can be coupled to a first external display device, such as a first television monitor 418, and the second set-top box device 424 can be coupled to a second external display device, such as a second television monitor 426. Moreover, the first set-top box device 416 can communicate with a first remote control 420, and the second set-top box device 424 can communicate with a second remote control 428. The set-top box devices 416, 424 can include IPTV set-top box devices; video gaming devices or consoles that are adapted to receive IPTV content; personal computers or other computing devices that are adapted to emulate set-top box device functionalities; any other device adapted to receive EPTV content and transmit data to an IPTV system via an access network; or any combination thereof.

In an exemplary, non-limiting embodiment, each set-top box device 416, 424 can receive data, audio, video, or any combination thereof, from the client-facing tier 402 via the access network 466 and render or display the data, audio, video, or any combination thereof, at the display device 418, 426 to which it is coupled. In an illustrative embodiment, the set-top box devices 416, 424 can include tuners that receive and decode television programming signals or packet streams for transmission to the display devices 418, 426. Further, the set-top box devices 416, 424 can include a STB processor 470 and a STB memory device 472 that is accessible to the STB processor 470. In one embodiment, a computer program, such as the STB computer program 474, can be embedded within the STB memory device 472.

In an illustrative embodiment, the client-facing tier 402 can include a client-facing tier (CFT) switch 430 that manages communication between the client-facing tier 402 and the access network 466 and between the client-facing tier 402 and the private network 410. As illustrated, the CFT switch 430 is coupled to one or more data servers, such as D-servers 432, that store, format, encode, replicate, or otherwise manipulate or prepare video content for communication from the client-facing tier 402 to the set-top box devices 416, 424. The CFT switch 430 can also be coupled to a terminal server 434 that provides terminal devices with a point of connection to the IPTV system 400 via the client-facing tier 402. In a particular embodiment, the CFT switch 430 can be coupled to a video-on-demand (VOD) server 436 that stores or provides VOD content imported by the IPTV system 400. Further, the CFT switch 430 is coupled to one or more video servers 480 that receive video content and transmit the content to the set-top boxes 416, 424 via the access network 466. The CFT switch 430 is also coupled to one or more filter servers 433 that inhibit transmission of prohibited content to user devices via the access network 466.

In a particular embodiment, the filter server 433 may prevent transmission of prohibited content to one or more user devices via the access network 466, the private network 410, or the public network 412. In an illustrative embodiment, content sent to a user device may be routed through the filter server 433. The filter server 433 may compare a textual representation of the audio component of the content to data identifying prohibited content. The filter server 433 may prevent transmission of prohibited content to the user device. Content not identified as prohibited content may be transmitted to the user device.

In an illustrative embodiment, the client-facing tier 402 can communicate with a large number of set-top boxes, such as the representative set-top boxes 416, 424, over a wide geographic area, such as a metropolitan area, a viewing area, a statewide area, a regional area, a nationwide area or any other suitable geographic area, market area, or subscriber or customer group that can be supported by networking the client-facing tier 402 to numerous set-top box devices. In a particular embodiment, the CFT switch 430, or any portion thereof, can include a multicast router or switch that communicates with multiple set-top box devices via a multicast-enabled network.

As illustrated in FIG. 4, the application tier 404 can communicate with both the private network 410 and the public network 412. The application tier 404 can include a first application tier (APP) switch 438 and a second APP switch 440. In a particular embodiment, the first APP switch 438 can be coupled to the second APP switch 440. The first APP switch 438 can be coupled to an application server 442 and to an OSS/BSS gateway 444. In a particular embodiment, the application server 442 can provide applications to the set-top box devices 416, 424 via the access network 466, which enable the set-top box devices 416, 424 to provide functions, such as interactive program guides, video gaming, display, messaging, processing of VOD material and other IPTV content, etc. In an illustrative embodiment, the application server 442 can provide location information to the set-top box devices 416, 424. In a particular embodiment, the OSS/BSS gateway 444 includes operation systems and support (OSS) data, as well as billing systems and support (BSS) data. In one embodiment, the OSS/BSS gateway 444 can provide or restrict access to an OSS/BSS server 464 that stores operations and billing systems data.

The second APP switch 440 can be coupled to a domain controller 446 that provides Internet access', for example, to users at their computers 468 via the public network 412. For example, the domain controller 446 can provide remote Internet access to IPTV account information, e-mail, personalized Internet services, parental control settings, or other online services via the public network 412. In addition, the second APP switch 440 can be coupled to a subscriber and system store 448 that includes account information, such as account information that is associated with users who access the IPTV system 400 via the private network 410 or the public network 412. In an illustrative embodiment, the subscriber and system store 448 can store subscriber or customer data and create subscriber or customer profiles that are associated with IP addresses, stock-keeping unit (SKU) numbers, other identifiers, or any combination thereof, of corresponding set-top box devices 416, 424. In another illustrative embodiment, the subscriber and system store 448 can store data associated with capabilities of set-top box devices associated with particular customers.

In a particular embodiment, the application tier 404 can include a client gateway 450 that communicates data directly to the client-facing tier 402. In this embodiment, the client gateway 450 can be coupled directly to the CFT switch 430. The client gateway 450 can provide user access to the private network 410 and the tiers coupled thereto. In an illustrative embodiment, the set-top box devices 416, 424 can access the IPTV system 400 via the access network 466, using information received from the client gateway 450. User devices can access the client gateway 450 via the access network 466, and the client gateway 450 can allow such devices to access the private network 410 once the devices are authenticated or verified. Similarly, the client gateway 450 can prevent unauthorized devices, such as hacker computers or stolen set-top box devices from accessing the private network 410, by denying access to these devices beyond the access network 466.

For example, when the first representative set-top box device 416 accesses the client-facing tier 402 via the access network 466, the client gateway 450 can verify subscriber information by communicating with the subscriber and system store 448 via the private network 410. Further, the client gateway 450 can verify billing information and status by communicating with the OSS/BSS gateway 444 via the private network 410. In one embodiment, the OSS/BSS gateway 444 can transmit a query via the public network 412 to the OSS/BSS server 464. After the client gateway 450 confirms subscriber and/or billing information, the client gateway 450 can allow the set-top box device 416 to access IPTV content and VOD content at the client-facing tier 402. If the client gateway 450 cannot verify subscriber information for the set-top box device 416, e.g., because it is connected to an unauthorized twisted pair, the client gateway 450 can block transmissions to and from the set-top box device 416 beyond the access network 466.

As indicated in FIG. 4, the acquisition tier 406 includes an acquisition tier (AQT) switch 452 that communicates with the private network 410. The AQT switch 452 can also communicate with the operations and management tier 408 via the public network 412. In a particular embodiment, the AQT switch 452 can be coupled to a live acquisition server 454 that receives or acquires television content, movie content, advertisement content, other video or audio content, or any combination thereof, from a broadcast service 456, such as a satellite acquisition system or satellite head-end office. The live acquisition server 454 may also receive data such as closed captioning data. In a particular embodiment, the live acquisition server 454 can transmit the data and content to the AQT switch 452, and the AQT switch 452 can transmit the data and content to the CFT switch 430 via the private network 410.

In an illustrative embodiment, data and content can be transmitted to the D-servers 432, where it can be encoded, formatted, stored, replicated, or otherwise manipulated and prepared for communication from the video server(s) 480 to the set-top box devices 416, 424. The CFT switch 430 can receive data and content from the video server(s) 480 and communicate the data and content-to the CPE 414, 422 via the access network 466. The set-top box devices 416, 424 can receive the data and content via the CPE 414, 422, and can transmit the data and content to the television monitors 418, 426.

Further, the AQT switch 452 can be coupled to a video-on-demand importer server 458 that receives and stores television or movie content received at the acquisition tier 406 and communicates the stored content to the VOD server 436 at the client-facing tier 402 via the private network 410. Additionally, at the acquisition tier 406, the video-on-demand (VOD) importer server 458 can receive content from one or more VOD sources outside the IPTV system 400, such as movie studios and programmers of non-live content. The VOD importer server 458 can transmit the VOD content to the AQT switch 452, and the AQT switch 452, in turn, can communicate the material to the CFT switch 430 via the private network 410. The VOD content can be stored at one or more servers, such as the VOD server 436.

When users issue requests for VOD content via the set-top box devices 416, 424, the requests can be transmitted over the access network 466 to the VOD server 436, via the CFT switch 430. Upon receiving such requests, the VOD server 436 can retrieve the requested VOD content and transmit the content to the set-top box devices 416, 424 across the access network 466, via the CFT switch 430. The set-top box devices 416, 424 can transmit the VOD content to the television monitors 418, 426.

FIG. 4 further illustrates that the operations and management tier 408 can include an operations and management tier (OMT) switch 460 that conducts communication between the operations and management tier 408 and the public network 412. In the embodiment illustrated by FIG. 4, the OMT switch 460 is coupled to a TV2 server 462. Additionally, the OMT switch 460 can be coupled to an OSS/BSS server 464 and to a simple network management protocol (SNMP) monitor 486 that monitors network devices within or coupled to the IPTV system 400. In a particular embodiment, the OMT switch 460 can communicate with the AQT switch 452 via the public network 412.

In an illustrative embodiment, the live acquisition server 454 can transmit content to the AQT switch 452, and the AQT switch 452, in turn, can transmit the content to the OMT switch 460 via the public network 412. In this embodiment, the OMT switch 460 can transmit the content to the TV2 server 462 for display to users accessing the user interface at the TV2 server 462. For example, a user can access the TV2 server 462 using a personal computer 468 coupled to the public network 412.

In conjunction with the configuration of structure described herein, the system and method disclosed filtering of audio data. In a particular illustrative embodiment, a textual representation of audio data received at a filter server may be compared with data identifying prohibited audio content. Portions of the audio data not identified as prohibited audio content may be transmitted to a remote user device. Other portions of the audio data that are identified as prohibited audio content may not be transmitted to the remote user device.

Figure 5:
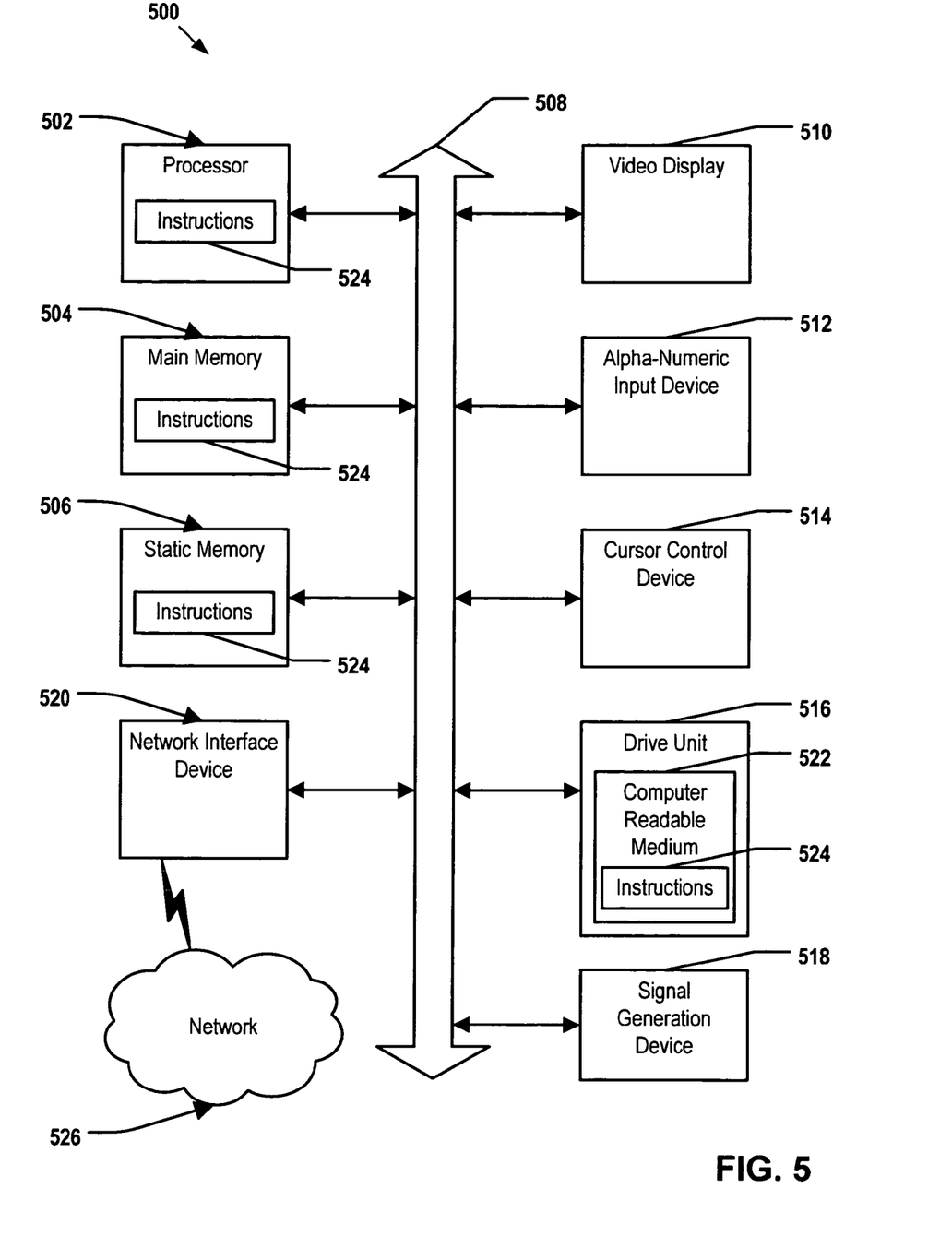
FIG. 5 is a block diagram of an illustrative embodiment of a computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. In an illustrative embodiment, the computer system 500 may include any one or more of the filter servers, other servers, content sources or user devices depicted in FIGS. 1, 2, 3 and 4.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic-and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over-a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of filtering audio data, the method comprising:
  receiving data packets of media content at a filter server, wherein the media content comprises video content and audio content;
  comparing a textual representation of the audio content with data identifying prohibited audio content at the filter server; and
  transmitting modified media content from the filter server to a remote user device, wherein the modified media content includes a first set of the data packets that are identified as not including the prohibited audio content, wherein the modified media content is transmitted without a second set of the data packets that are identified as including the prohibited audio content, and wherein the modified media content is transmitted without replacement data packets for the second set of the data packets.

2. The method of claim 1, further comprising accessing a database of closed captioning data to obtain the textual representation of the audio content.

3. The method of claim 1, further comprising preparing the textual representation by voice to text conversion.

4. The method of claim 1, wherein the prohibited audio content comprises prohibited language content.

5. The method of claim 1, further comprising dropping the second set of the data packets corresponding to the prohibited audio content.

6. The method of claim 1, wherein the data identifying prohibited audio content is based at least partially on user defined settings.

7. The method of claim 1, wherein the remote user device comprises a mobile communication device.

8. The method of claim 1, wherein the remote user device comprises a television display.

9. The method of claim 1, wherein the remote user device comprises a set-top box device.

10. The method of claim 1, wherein the remote user device comprises a computer.

11. The method of claim 1, wherein the modified media content is transmitted to the remote user device via an internet protocol television network.

12. An audio data filtering system, comprising:
  an input interface to receive media content as data packets, wherein the media content includes video content and audio content;
  an analysis module to compare a textual representation of the audio content to data identifying prohibited audio content;
  a packet filter to prevent transmission of a first set of the data packets that are identified as including the prohibited audio content to a remote user device; and
  an output interface to transmit filtered media content to the remote user device as a second set of the data packets that are identified as not including the prohibited audio content, wherein the second set of data packets is transmitted without replacement data packets for the first set of the data packets.

13. The system of claim 12, wherein the packet filter is adapted to identify the first set of the data packets that are associated with the prohibited audio content and to remove the first set of the data packets from a packet stream before the output interface transmits the packet stream.

14. The system of claim 12, further comprising a blocking module to prevent transmission of substantially all content from a content source to the remote user device.

15. The system of claim 12, further comprising a parental control settings database to store parental control settings associated with the remote user device including a list of prohibited terms.

16. The system of claim 15, wherein the parental control settings database further comprises an identification of one or more prohibited content sources.

17. A non-transitory computer readable storage medium comprising computer readable instructions, wherein the computer readable instructions are executable by a processor to:
  receive data packets of media content, wherein the media content comprises video content and audio content;
  compare a textual representation of the audio content to data identifying prohibited audio content;
  send modified media content to a remote user device, wherein the modified media content includes a first set of the data packets that are identified as not including the prohibited audio content, wherein the modified media content is sent without a second set of the data packets that are identified as including the prohibited audio content, and wherein the modified media content is sent without replacement data packets for the second set of the data packets.

18. The non-transitory computer readable storage medium of claim 17, further comprising computer readable instructions executable by the processor to generate the textual representation based at least partially on the audio content.

19. The non-transitory computer readable storage medium of claim 17, wherein the first set of the data packets that are identified as not including the prohibited audio content are sent to the remote user device via a streaming media protocol.

20. The non-transitory computer readable storage medium of claim 17, further comprising computer readable instructions executable by the processor to determine a rating associated with the media content and to prevent the media content from being sent to the remote user device based at least partially on the rating.

21. The non-transitory computer readable storage medium of claim 17, further comprising computer readable instructions executable by the processor to receive the media content via a streaming media protocol.

* * * * *